INVENTOR
Maurice Nachshen
BY Max L. Libman
ATTORNEY

United States Patent Office 3,411,302
Patented Nov. 19, 1968

3,411,302
IN-GROUND RESERVOIR WITH FROZEN BOTTOM FOR THE STORAGE OF LIQUEFIED GASES
Maurice Nachshen, London, England, assignor to Conch International Methane Limited, Nassau, The Bahamas, a Bahamian company
Filed Jan. 10, 1967, Ser. No. 608,404
Claims priority, application Great Britain, Feb. 28, 1966, 8,653/66
7 Claims. (Cl. 61—36)

ABSTRACT OF THE DISCLOSURE

The present invention relates to a method of constructing a bottom of frozen soil to an intended in-ground storage cavity for liquefied gases, in advance of its excavation and to a predetermined thickness, so that external soil and water would be excluded during excavation so enabling the cavity to be excavated.

Background of the invention

Figure 1:
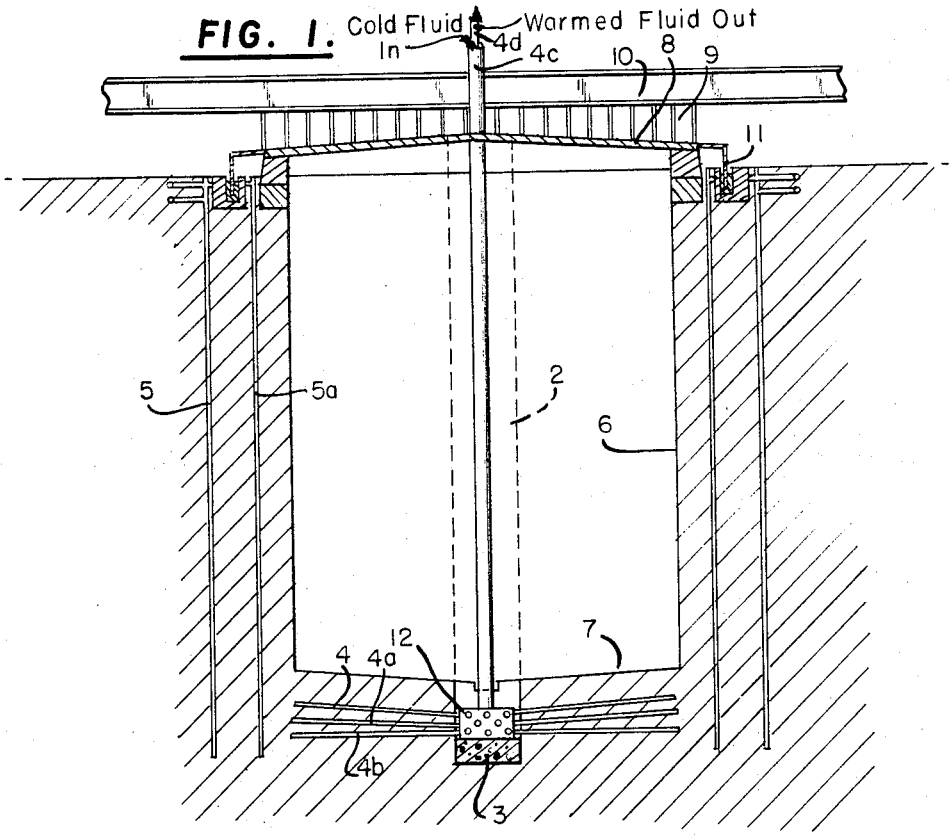

This invention relates to the storage of liquefied gases and has particular relevance to the storage of liqufied natural gas, such as liquefied methane, and liquefied petroleum gases such as liquefied propane or butane.

In the specification and claims the expression "liquefied gas" means a liquid which boils at atmospheric pressure and at a temperature below ambient temperature, and the expression "a cavity in the surface of the earth" means a hollow in the surface of the earth which has a substantial area on the plane of the surface in relation to its capacity and this is not intended to include narrow shafts or wells.

Among the proposals which have been advanced for the storage of liquefied gas, a promising convenient system involves a reservoir comprising a cavity in the surface of the earth, the soil surrounding the cavity containing a liquid such as water, which can be solidified by the circulation of a cold liquid in pipes before the excavation of the cavity, the liquid being maintained solid by the withdrawal of heat from it by the stored liquefied gas; a thermally insulated roof completely covering the cavity; a gas vent; and conduit and pumping means for filling and discharging liquid from the reservoir. U.S. Patent No. 3,159,006 deals with such a reservoir and describes means whereby such a reservoir can be constructed.

Where a thick stratum of impervious soil such as stiff clay exists at a suitable level, the pre-frozen walls of the intended cavity can be extended into such stratum and so form a continuous impervious and strong body which can be successfully excavated and dewatered. However, the geological conditions may be such that no impervious stratum of sufficient thickness and strength exists at the required level. If the walls of the intended reservoir have their lower ends in pervious and water-bearing strata such as gravel, sand or silt, or a mixture thereof, no natural bottom seal to the cavity will result. Dewatering during excavation under the described conditions would cause inflow of soil and water into the excavation which may prevent its completion.

The device of maintaining the water level in the cavity to balance the external water pressure, so preventing inflow, would result in the whole or greater part of the body of water in the cavity becoming frozen by the cold circulating in the pipes installed outside the peripheral walls of the cavity. The internal ice would obstruct further excavation of soil, which would also have become frozen and hard. Finally the ice would also have to be excavated.

The ultimate dewatering of a cavity made by this method would depend on a sufficiently thick mass of frozen soil being formed completely enclosing the underside of the intended cavity. According to the present invention in the construction of an in-ground reservoir for the storage of liquefied gases comprising a cavity as hereinbefore defined in the surface of the earth, a system of horizontal or inclined pipes is provided in the water-bearing ground below the bottom of the cavity. Such a method of construction can be realized by initially sinking a caisson or shaft into the earth and from the base thereof thrusting a series of horizontal or inclined radial pipes into the soil below the intended cavity level, which soil is then frozen and maintained frozen with the aid of cold fluid supplied to the said pipes. The radial pipes inserted by boring or thrust-boring at or near the bottom of the caisson or shaft are preferably arranged in two or more tiers. The pipes in successive tiers may be staggered in relation to the pipes in an adjacent tier and advantageously the pipes diverge in the outward direction.

If desired, the soil adjacent to and outside the periphery of the proposed cavity may also be maintained frozen before and during excavation, for instance by applying a cold medium to a series of pipes inserted downwardly into the soil outside the periphery of the cavity. Such a procedure can be particularly advantageous where it is proposed to rely on an in-ground reservoir of which the side walls are unlined and the cavity is maintained substantially impervious by liquid frozen in the surrounding soil.

In carrying out the constructional method of the present invention, a caisson or shaft is first sunk into the ground using conventional techniques. When the caisson or shaft has been sunk to the desired depth which lies a little below the level of the bottom of the intended cavity in the earth, a concrete plug is formed under water at the bottom of the caisson or shaft in order to prevent any further substantial access of water, etc. The shaft or caisson is then dewatered. A series of radial pipes is then inserted by boring or thrust boring from the base of the shaft, such pipes preferably being given an upward inclination and being arranged in several tiers, each tier sweeping the area below the bottom of the cavity. Alternatively and if the depth is not excessive, compressed air may be used to exclude water from the caisson or shaft and the plug constructed in the dry. As a further alternative, one of the known methods of "ground-water lowering" may be used to exclude water to enable the plug to be made in the dry. The provision of several tiers of pipes upwardly inclined and diverging in the outward direction carries the advantages of permitting the formation of a substantial solid frozen plug of soil below the intended bottom of the cavity and also enables the bottom of the cavity to be given an inverted dome shape which is better adapted to contain upward thrust and distribute load onto the walls of the cavity. Frozen conditions are maintained in the ground below the bottom of the cavity and and in the soil surrounding the periphery of the cavity throughout the excavation works by supplying a cold fluid to the various pipes and these are desirably double pipes to provide a flow of fluid outward by an inner pipe with return through the outer pipe.

Description of the invention

Figure 2:
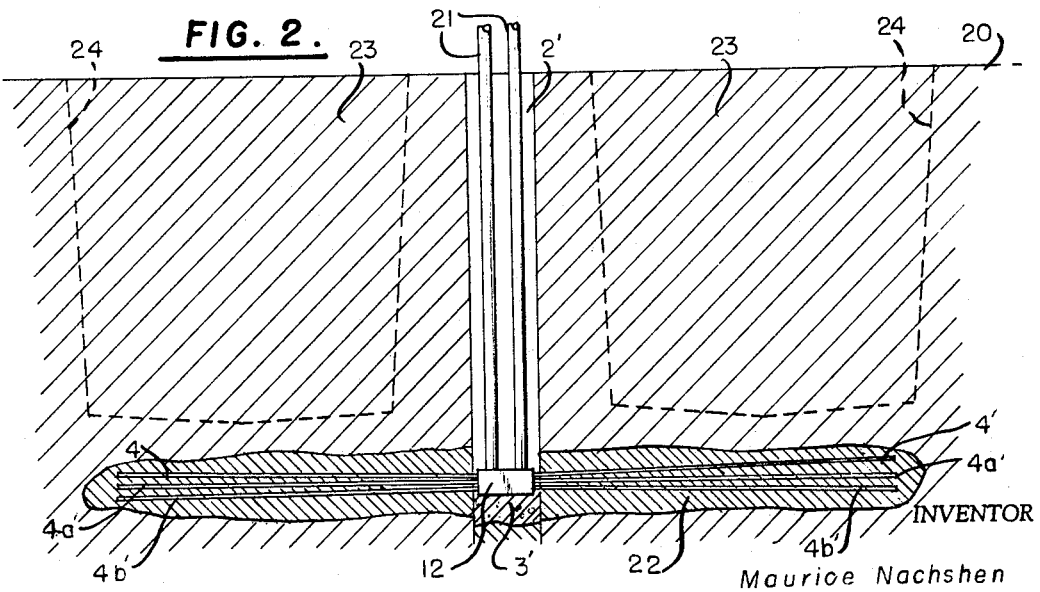

The invention will now be described with reference to the accompanying drawing wherein FIG. 1 represents a vertical section through an in-ground reservoir showing pipes inserted in the earth below the bottom of the cavity and also outside the periphery of the cavity; and FIG. 2 is a similar section showing another form of the invention, wherein two adjacent reservoirs are to be dug.

Referring to FIG. 1, in order to provide an in-ground reservoir below the surface 1 of the earth, a shaft 2 shown in dotted lines is first sunk by conventional techniques, the said shaft having a metal or concrete lining. When the shaft has reached a point below the planned bottom of the proposed cavity a concrete plug 3 is formed in the bottom of the shaft which is then dewatered. Working immediately above this plug a series of radial double freeze pipes 4, 4a and 4b are inserted by thrust-boring into the soil. The freeze pipe construction is the common one wherein the outer pipe of each double pipe is closed at the distant end and the inner pipe is open, so enabling freezing fluid to be circulated. As shown in the drawings, these pipes may be arranged in three tiers but two of more than three tiers may be used. While they all diverge in the outward direction the pipes are all connected at their inner ends in a gland box 12 and the number of pipes capable of being passed into this gland box is increased by the staggering of pipes in successive tiers. Supply and return manifold pipes connected by flow and return pipes 4c and 4d to the surface are attached to the pipes whereby a cold medium can be circulated in order to freeze the ground in the vicinity of the area traversed by this series of radial pipes.

A further series of pipes 5, 5a are inserted downwardly into the earth from the surface and these are disposed in a ring which surrounds the ground in which the cavity is to be formed. In these pipes also arrangements are made to circulate a supply of cold fluid with a view to freezing the water-bearing strata round the pipes and around the planned periphery of the cavity.

The reservoir is also provided with a thermally insulated roof 8 suspended by a series of hangers 9 to a superstructure 10 and this roof membrane 8 is in turn provided with a gas seal 11 formed in an annular channel just outside the periphery of the reservoir, as is known in this art.

The ground around the periphery and below the bottom of the planned cavity having been frozen, excavation work is then undertaken to form the cavity 6 which constitutes the reservoir for the storage of liquefied gases. The base 7 of this cavity is given an inverted dome shape so that the bottom of the cavity roughly follows the lines of the series of pipes immediately adjacent the bottom.

It will be understood that in practice a simple demarcation line between frozen and unfrozen soil may not necessarily occur and that there may be an intermediate zone in which some partial freezing occurs. It should be understood that the frozen zone must have a sufficient depth or thickness to provide adequate resistance to the external water pressure in the ground, and this is particularly important in relation to the zone below and near the bottom of the cavity.

The supply and exit lines to the bottom pipes may be diverted to pass up near the walls of the cavity and the caisson or shaft demolished just prior to the introduction of liquefied gases for storage.

It will, of course, be understood that the construction of the reservoir would require the provision of a thermally insulated roof. Such roof must also be fitted with a gas vent whereby gases produced in the reservoir can be led to disposal points or recovery plant. Preferably such vent is fitted with a pressure control device which controls the pressure of gas in the reservoir, as is well known in this art.

Conduit and pumping means for filling and discharging the reservoir must also be provided and may be of any suitable type. Normally the gas vent and the conduits for filling and discharging the reservoir will pass through the roof and preferably through a gland in the roof. All such arrangements have already been described in detail, for instance in Patent No. 3,159,006 and in other documents, and since the present invention calls for no particular modification in these arrangements they do not require a further detailed discussion here.

If it is required to construct two or more in-ground reservoirs in close proximity to each other in water-bearing earth formation which has no suitable stratum of impervious soil at about the required level, the method of the present invention may be of advantage. In that case the shaft or caisson is sunk centrally to the reservoirs to be excavated and after freezing of the bottoms of the intended cavities said reservoirs are excavated on both sides of the caisson or shaft. The radial pipes have to extend farther into the earth-formation surrounding the caisson or shaft whereas the tiers have to be arranged such that the soil underneath the bottoms of the intended cavities will fully freeze.

FIG. 2 represents a vertical section through two in-ground reservoirs to be excavated at both sides of the central caisson of shaft. In FIG. 2 the situation prior to excavation is represented wherein the method of the invention is used in constructing two in-ground reservoirs in close proximity to each other. In the earth formation 23 a shaft 2' centrally located with respect to two intended cavities 24 extends to below the bottoms of said cavities and is closed by a concrete plug 3'. Pipes 21, corresponding to pipes 4c and 4d of FIG. 1, connected to a refrigeration plant (not shown) on the earth surface 20, extend in the shaft 2' and are connected to the gland box 12. Cold fluid is supplied to the freezing pipes 4', 4a' and 4b' attached to the gland box 12 via the double pipes 21. The soil frozen by the circulating fluid and forming a water barrier during the excavation work is represented by 22. If desired, the soil adjacent to the periphery of the intended cavities may also be maintained frozen in the same way as shown in FIG. 1.

The shaft 2' may be sunk beside or adjacent the intended excavation where only one excavation is to be used, and will be available for a later second excavation. It may be used, after completion of the reservoir (or reservoirs), as a work shaft for piping into the reservoir or for any other useful purpose.

The application of the invention is herein described in relation to a cavity made within walls of pre-frozen soil but it is equally applicable to a cavity made within walls made by other methods. Examples are walls sunk into the ground of caissons of any material, walls made by placing concrete in trenches excavated with the aid of solid internal supports or with the aid of bentonite- or clay-mud, walls made by injecting cement or other chemicals into the soil, walls made of piling, either metal, concrete or wood.

It will be apparent that the embodiments shown are only exemplary and that various modifications can be made in construction and arrangement within the scope of the invention as defined in the appended claims.

I claim:

1. Method of constructing an in-ground reservoir for the storage of liquefied gases in terrain which is water-permeable at the level of the bottom of the reservoir comprising
    (a) sinking a shaft into the ground in the vicinity of an intended in-ground reservoir down to at least the depth of the intended reservoir,
    (b) maintaining the bottom of the shaft substantially free of water,
    (c) thrusting a series of generally horizontal freeze pipes from points near the bottom of said shaft into the water-permeable soil beneath the bottom of the intended reservoir, said pipes being arranged in at least two tiers and extending at least to the outer periphery of the bottom of the intended reservoir,
    (d) excluding the soil-held water external to said intended reservoir from the sides of the intended reservoir,
    (e) circulating a fluid refrigerant in said freeze pipes to freeze the soil throughout the entire bottom area of the intended reservoir, (f) excavating the ground enclosed by said sides and bottom to form a liquid-tight reservoir.

2. Method as claimed in claim 1,
(g) said shaft being sunk within the volume of the intended reservoir.

3. Method as claimed in claim 2,
(h) said shaft being sunk at the center of the area of the intended reservoir,
(i) said freeze pipes being extended radially from the shaft substantially to the wall area of the intended reservoir.

4. Method as claimed in claim 3,
(j) said freeze pipes being extended on an upward slant from the shaft so as to form an inverted dome-shaped icy-soil impervious shield at the bottom of the reservoir.

5. Method as claimed in claim 1,
(k) said shaft being sunk beside the intended reservoir, between it and a second adjacent intended reservoir,
(l) said freeze pipes being extended from said shaft underneath both of said intended reservoirs, whereby two reservoirs may be served by a single shaft.

6. Method as claimed in claim 1,
(m) said step of excluding water from the sides of the reservoir being accomplished by freezing the soil at said sides.

7. Method as claimed in claim 7,
(n) the pipes in successive ones of said tiers being staggered.

References Cited

UNITED STATES PATENTS 3,295,328  1/1967  Bishop.

FOREIGN PATENTS 24,808  11/1896  Great Britain.

JACOB SHAPIRO, *Primary Examiner.*